United States Patent Office 3,530,124
Patented Sept. 22, 1970

3,530,124
4-(5-NITRO-2-THIAZOLYL)-THIOMOR-
PHOLINE-OXIDES
Atso Ilvespaa, Neu-Allschwil, Switzerland, assignor to
Ciba Corporation, New York, N.Y., a corporation of
Delaware
No Drawing. Filed Feb. 21, 1968, Ser. No. 707,296
Claims priority, application Switzerland, Mar. 17, 1967,
3,899/67; July 25, 1967, 10,530/67; Sept. 20, 1967,
13,204/67; Jan. 18, 1968, 756/68
Int. Cl. C07d 93/10
U.S. Cl. 260—243                             13 Claims

ABSTRACT OF THE DISCLOSURE

Compounds of the formula

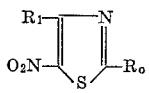

in which $R_o$=optionally substituted thiomorpholine-1-oxide or 1,1-dioxide group $R_1$=substituent, e.g. hydrocarbon radical of aliphatic character e.g. 4-[nitrothiazolyl-(2)]-thiomorpholine-1,1-dioxide.
Use: Antiparasitary agents

SUMMARY OF THE DISCLOSURE

The present invention relates to new thiomorpholino derivatives. Especially it concerns 1-oxides and 1,1-dioxides of thiomorpholines containing in position 4 a 5-nitrothiazolyl-(2) radical, pharmaceutical compositions containing the same, as well as a process for combating parasites consisting in administering said pharmaceutical compositions to a warm-blooded animal.

The thiomorpholine and thiazole rings in the new compounds may be further substituted, the thiomorpholine ring, for example, by alkyl radicals and/or alkoxyalkyl radicals and/or the 4-position of the thiazole ring, for example, by lower hydrocarbon residues of aliphatic character.

Particularly suitable lower hydrocarbon residues of aliphatic character are lower alkyl radicals, such as methyl, ethyl, propyl, isopropyl, butyl, isobutyl or pentyl residues. Alkyl radicals on the thiomorpholine-1-oxide ring or -1,1-dioxide ring are above all lower alkyl radicals, such as those mentioned above and alkoxyalkyl radicals are primarily lower alkoxy-lower alkyl radicals in which the lower alkyl radicals are especially those mentioned above, such as, for example, methoxymethyl, ethoxymethyl, propoxymethyl, methoxyethyl, ethoxyethyl or propoxyethyl radicals.

The new compounds possess valuable pharmacological properties. In addition to a trichomonade-inhibiting effect they display above all an amoebicidal activity as can be demonstrated in animal tests, for example on administration of an oral dose of 30–150 mg./kg. to hamsters. Furthermore, they act against schistosomes, especially S-mansoni, as can be shown in tests on mice infected with schistosomes. The new compounds are therefore useful as antiparasitary agents. They are especially suited to the treatment of diseases caused by the pathogens mentioned. The new compounds are, however, also valuable intermediates for the manufacture of other useful substances.

Particularly valuable biological properties are found in the compounds in which the 5-nitrothiazolyl-(2) radical is unsubstituted, especially compounds of the formula

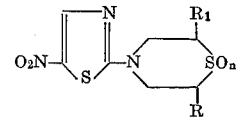

in which $n$ represents 1 or 2, R and $R_1$ are lower alkyl radicals or hydrogen, and very specially in 4-[5-nitrothiazolyl-(2)]-2,6-dimethyl-thiomorpholine-1-oxide of the formula

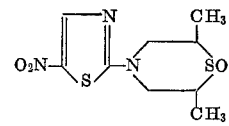

4 - [5 - nitrothiazolyl - (2)] - 2,6 - dimethyl - thiomorpholine-1,1-dioxide of the formula

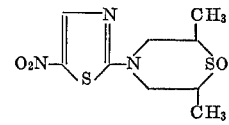

4-[5-nitrothiazolyl - (2)] - thiomorpholine - 1 - oxide and above all in 4-[5-nitrothiazolyl-(2)]-thiomorpholine-1,1-dioxide of the formula

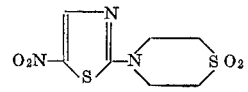

which, for example on hamsters in an oral dose of 30–100 mg./kg., produces a pronounced curative effect against abscesses of the liver caused by E. histolytica.

The new compounds are manufactured by known methods.

For example, a 5-nitrothiazole which contains in position 2 a halogen atom, such as a chlorine or bromine atom, is condensed with a thiomorpholine-1-oxide or -1,1-dioxide.

The condensation is preferably carried out at room temperature, advantageously in the presence of a solvent, above all ethyl acetate or an acid amide such as dimethylformamide, or in chloroform or dimethylsulphoxide and/or with a condensing agent, especially a basic condensing agent such as a tertiary amine, for example a tri-lower alkylamine, such as trimethylamine or triethylamine, or pyridine, or an alkali metal acetate or carbonate.

The new compounds are also obtained when a thiomorpholine that contains in position 4 a 5-nitrothiazolyl-(2) residue is oxidized to form the sulphoxide (1-oxide) or sulphone (1,1-dioxide).

This oxidation can be carried out in known manner, for example by reaction with an oxidant such as hydrogen peroxide, a peracid, such as especially peracetic acid, a perbenzoic acid or monoperphthalic acid, which may be substituted, for example by chlorine atoms, chromic acid, potassium permanganate or nitric acid or the like. When this reaction is carried out at a low temperature or with the use of only one mol equivalent of the oxidant, the sulphoxides are obtained, whereas by heating and/or use of at least 2 mol equivalents of the oxidant and sulphones are obtained.

The new compounds are also obtained when a 5-nitrothiazole compound that contains in position 2 a residue of the formula

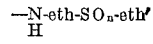

in which $n$ stands for 1 or 2, eth represents an ethylene-(1,2) residue and eth' a vinyl radical is subjected to intramolecular condensation. The condensation is carried out in known manner, preferably in the presence of solvents and/or condensing agents, if required or desired with heating.

The new compounds are also obained when a 1-oxide or 1,1-dioxide of a thiomorpholine that contains in position 4 a thiazolyl-(2) residue unsubstituted in position 5, is nitrated. The nitration is carried out in the manner known to thiazole chemistry, advantageously with the use of nitric acid, if desired in concentrated or fuming form and/or with addition of concentrated sulphuric acid.

Substituents in the final products may be modified or eliminated to suit the definition. Thus, for example, a resulting 1-oxide may be oxidized to a 1,1-dioxide. This oxidation is carried out in known manner, for example as described above for the oxidation leading to the dioxides.

The invention further includes any modification of the process in which an intermediate obtainable at any stage thereof is used as starting material and any remaining step/steps is/are carried out, in which a starting material is formed under the reaction conditions or may be used in the form of a salt or a mixture of isomers or racemates or of their constituents.

Thus, for example, a thiomorpholine containing on the nitrogen atom a thiazolyl-(2) residue unsubstituted in position 5 may be reacted with nitric acid to form a intermediate the above-mentioned starting material, that is to say a thiomorpholine compound containing in position 4 a 5-nitrothiazolyl-2 residue or, respectively, a thiomorpholine-1-oxide or 1,1-dioxide containing in position 4 a thiazolyl-(2) residue unsubstituted in position 5.

Furthermore, 5-nitrothiazoles containing in position 2 a free amino group may be reacted with a compound of the formula eth''—SO$_n$—eth' in which $n$ represents 1 or 2, eth'' and eth' each represents a vinyl radical. In this reaction there are intermediately formed the above-mentioned 5-nitrothiazole compounds containing in position 2 a residue of the formula

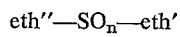

which are then cyclized according to this invention.

Provided they are substituted on the carbon atoms of the thiomorpholine-1-oxide or -1,1-dioxide ring, the new compounds may take the form of cis-isomers and trans-isomers or possibly racemates or optical antipodes, depending on the degree of substitution. The resulting racemates and isomers mixtures respectively may, if desired, be separated in the usual manner.

Mixtures of isomers or racemates can be separated in known manner into the pure isomers or pure racemates by virtue of the physico-chemical differences of the constituents, for example by chromatography and/or fractional crystallization.

Pure racemates may likewise be resolved into their optical antipodes by known methods. It is preferably to isolate the more active of the constituents.

When the starting material is a cis- or trans-isomer or an optical antipode of a 4-[thiazolyl-(2)]-thiomorpholine-1-oxide or 1,1-dioxide unsubstituted in the 5-position of the thiazole ring and substituted in the thiomorpholine ring, the corresponding cis- or trans-isomers or optical antipodes of the desired nitrothiazolyl-thiomorpholine-1-oxides or 1,1-dioxides are formed as end products.

According to this invention it is, however, also possible to obtain the final products in the form of the cis- or transisomers or optical antipodes when a 5-nitrothiazole that contains in position 2 a residue exchangeable for an amino group, preferably a 2-halogeno-5-nitrothiazole, is condensed with a cis- or trans-isomer or with an optical antipode of a substituted thiomorpholine-1-oxide or 1,1-dioxide, or when a cis- or trans-isomer of an optical antipode of a substituted nitrothiazolyl-thiomorpholine is oxidized.

The said reactions are carried out in the usual manner, in the presence or absence of diluents, condensing agents and/or catalysts, at room temperature or with cooling or heating, under atmospheric or superatmospheric pressure or under an inert gas.

Preferred starting materials are those which give rise to the above-mentioned, specially valuable products.

The starting materials are known or, insofar as they are new, they are accessible in known manner.

Thus, for example the thiomorpholines carrying in the 4-position a 5-nitrothiazolyl-(2) radical that are used as starting material can be obtained according to application Ser. No. 561,050, now U.S. Pat. No. 3,464,984 by condensing a 5-nitrothiazole having a halogen atom in 2-position with a thiomorpholine. Depending on the degree of substitution and the selection of the thiomorpholine, the 4 - [5-nitrothiazolyl-(2)]-thiomorpholine is obtained as a racemate, a mixture of isomers, a pure compound, or in the form of an optical antipode. A resulting mixture of isomers can be split in the usual manner into the pure isomers and/or the racemates into the optical antipodes.

The new compounds can be used, for example, in the form of pharmaceutical preparations containing these compounds in conjunction or admixture with an organic or inorganic, solid or liquid pharmaceutical excipient, which is suitable e.g. for enteral, for example oral, or parenteral administration. Suitable excipients are substances that do not react with the new compounds, for example water, gelatin, lactose, starches, magnesium stearate, talcum, vegetable oils, benzyl alcohols, gums, polyalkylene, glycols, cholesterol or other known medicinal excipients. The pharmaceutical preparations may be, for example, tablets, dragees or capsules, or in liquid form solutions, suspensions or emulsions. They may be sterilized and/or contain assistants such as preserving, stabilizing, wetting or emulsifying agents, salts for regulating the osmotic pressure or buffers. They may also contain further therapeutically valuable substances. The preparations are formulated by the conventional methods.

The above-mentioned compounds may also be used in combination with conventional animal fodders or vehicles as fodders or additives to fodders respectively in animal husbandry.

The following examples illustrate the invention.

EXAMPLE 1

A solution of 2.0 g. of m-chloroperbenzoic acid of 85% strength in 50 cc. of methylenechloride is stirred dropwise within 30 minutes at 20–25° C. into a solution of 2.6 g. of 2,6-dimethyl-4-[5-nitrothiazolyl-(2)]-thiomorpholine in 50 cc. of methylenechloride. The batch is stirred on for 3 hours at room temperature and the clear reaction mixture agitated at first with 3× 50 cc. of 0.5 N-aqueous sodium bicarbonate solution and then with 2× 50 cc. of water. The methylenechloride solution is dried over anhydrous magnesium sulphate and evaporated. The oily residue crystallizes overnight and then melts at 113–121° C. On recrystallization from 10 cc. of methanol 4 - [5-nitrothiazolyl-(2)]-2,6-dimethylthiomorpholine-1-oxide of the formula

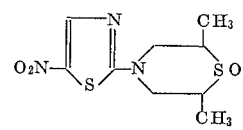

melting at 129–132° C. is obtained.

EXAMPLE 2

A solution of 4.0 g. of m-chloroperbenzoic acid of 85% strength in 75 cc. of methylenechloride is stirred dropwise within 30 minutes at 20–25° C. into a solution of 2.6 g. of 2,6 - dimethyl-4-[5-nitrothiazolyl-(2)]-thiomorpholine in 50 cc. of methylenechloride. The batch is stirred on for 4 hours at room temperature, the precipitated m-chlorobenzoic acid is suctioned off and the clear solution is agitated with 3× 50 cc. of 0.5 N-aqueous sodium bicarbonate solution and then with 2× 50 cc. of water. The methylenechloride solution is dried over anhydrous magnesium sulphate and evaporated. The residue melts at about 165–175° C. Recrysallization from 10 cc. of dioxane furnishes 4 - [5-nitrothiazolyl-(2)]-2,6-dimethyl-thiomorpholine-1,1-dioxide of the formula

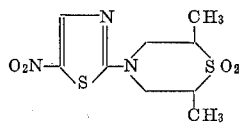

melting at 189–193° C.

EXAMPLE 3

A solution of 2.0 g. of m-chloroperbenzoic acid of 85% strength in 50 cc. of methylenechloride is stirred dropwise within 30 minutes at 20–25° C. into a solution of 2.3 g. of 4-[5-nitrothiazolyl-(2)]-thiomorpholine in 50 cc. of methylenechloride. The batch is stirred on for 3 hours at room temperature, then the turbid reaction mixture is diluted with 50 cc. of methylenechloride, agitated with 50 cc. of 0.5 N-sodium bicarbonate solution and the undissolved matter is suctioned off. After washing with water and methanol 4-[5-nitro-2-thiazolyl-(2)]-thiomorpholine-1-oxide of the formula

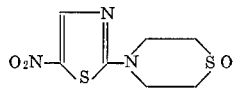

is obtained, which melts at 227–228° C. with slight decomposition.

The methylenechloride solution is agitated with 2× 50 cc. of 0.5 N-sodium bicarbonate solution and then with 2× 50 cc. of water, dried and exaporated. The residue is recrystallized from 5 cc. of dimethylformamide to furnish more 4-[5-nitro-2-thiazolyl-(2)]-thiomorpholine-1-oxide.

EXAMPLE 4

A solution of 4.0 g. of m-chloroperbenzoic acid of 85% strength in 225 cc. of methylenchloride is stirred dropwise within 30 minutes at 20–25° C. into a solution of 2.3 g. of 4-[5-nitrothiazolyl-(2)]-thiomorpholine in 150 cc. of methylenechloride. The batch is stirred on for 3 hours at room temperature, then the turbid reaction mixture is agitated with 50 cc. of 0.5 N-sodium bicarbonate solution and the undissolved matter is suctioned off. Washing with water and methanol furnishes pure 4 - [5 - nitrothiazolyl - (2)] - thiomorpholine-1,1-dioxide of the formula

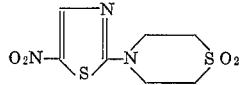

melting at 258° C. with slight decomposition. When the methylenechloride solution is worked up, further 4-[5-nitrothiazolyl-(2)]-thiomorpholine-1,1-dioxide can be obtained.

EXAMPLE 5

A solution of 65.3 g. of 2-chloro-5-nitro-thiazole in 350 ml. of ethyl acetate is stirred dropwise within 3 minutes into a solution of 54.8 g. of thiomorpholine-1,1-dioxide and 56 ml. of absolute triethylamine in 800 cc. of ethyl acetate. The product begins to precipitate immediately. The whole is cooled slightly so that the temperature does not exceed 30° C., then stirred for 1½ hours at room temperature. The reaction product is then suctioned off, thoroughly washed with ethyl acetate, then triturated with water, suctioned off, washed with water and then with ethanol, and dried, to yield pure 4-[5-nitrothiazolyl - (2)] - thiomorpholine-1,1-dioxide which melts at 257° C., with slight decomposition. It is identical with the product obtained in Example 4.

EXAMPLE 6

A solution of 11.2 g. of 2-bromo-4-methyl-5-nitrothiazole in 75 ml. of ethyl acetate is dropped within 3 minutes into a solution of 7.0 g. of thiomorpholine-1,1-dioxide and 8 ml. of absolute triethylamine in 100 ml. of ethyl acetate. The batch is stirred for 2 hours at room temperature. The reaction product is then suctioned off, thoroughly washed with ethyl acetate, then triturated with water, suctioned off, washed with water and then with ethanol, and dried, to yield pure 4-[5-nitro-4-methyl-thiazolyl-(2)]-thiomorpholine-1,1-dioxide of the formula

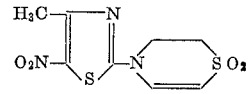

melting at 233° C.

The 2-bromo-4-methyl-5-nitrothiazole used as starting material can be prepared from 2-amino-4-methyl-5-nitrothiazole according to the Sandmeyer method; it melts at 38–39° C.

EXAMPLE 7

A solution of 20.0 g. of m-chloroperbenzoic acid of 85% strength in 500 ml. of methylenchloride is stirred dropwise within 1 hour at 20–25° C. into a solution of 25.9 g. of trans-4-[5-nitrothiazolyl-(2)]-2,6-dimethyl-thiomorpholine in 500 ml. of methylenechloride. The batch is then stirred for 3 hours at room temperature and the clear reaction mixture is agitated with 2× 300 ml. of 0.5 N-aqueous sodium bicarbonate solution and then with 2× 200 ml. of water. The methylenechloride solution is dried over anhydrous magnesium sulphate and evaporated. The solid residue is recrystallized from ½ litre of methanol, to yield trans-4-[5-nitrothiazoly-(2)]-2,6-dimethyl-thiomorpholine-1-oxide of the formula

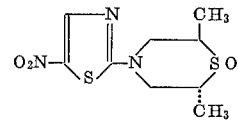

melting at 224–225° C. with slight decomposition.

Tans - 4 - [5 - nitrothiazolpl-(2)]-2,6-methyl-thiomorpholine can be manufactured in the following manner:

A solution of 16.5 g. of 2-chloro-5-nitrothiazole in 200 ml. of toluene is stirred dropwise with 30 minutes at 15–20° C. into a solution of 13.1 g. of trans-2,6-dimethyl-thiomorpholine and 15 ml. of absolute triethylamine in 200 ml. of toluene. The batch is stirred for 1½ hours at room temperature, then for 30 minutes at about 50° C., finally the reaction mixture is cooled in ice, the precipitate triethylamine hydrochloride is suctioned off and the filtrate evaporated. The evaporation residue is rechystallized from 140 ml. of isopropanol, to yield trans-4-[5-nitrothiazoly l- (2)] - 2,6-dimethylthiomorpholine melting at 120–121° C.

Trans-2,6-dimethylthiomorpholine may be prepared by careful farctional distillation of the isomer mixture obtained by condensing diallylamine with hydrogen sulphide; it boils at 105–106° C. under 63 mm. Hg. pressure and melt at 37–39° C.

Furthermore, trans - 4 - [5 - nitrothiazolyl-(2)]-2,6-dimethylthiomorpholine can be prepared from the racemate of the compound mentioned above, whose manufacture has been described in Belgian Patent 684,527, in the following manner:

1300 grams of silicagel for chromatography (particle size 0.05–0.2 mm.) are suspended in a 95:5-mixture of cyclohexane and ethyl acetate. This suspension is used to prepare a chromatography column, taking very good care that the column is filled uniformly. 8.5 grams of 4-[5-nitrothiazolyl-(2)]2,6-dimethylthiomorpholine are dissolved in 400 ml. of a 9:1-mixture of cyclohexane and ethyl acetate and this solution is allowed to percolate into the column. The column is then eluted with a 95:5-mixture of cyclohexane and ethyl acetate. The first 10.5 litres of eluate are discarded. Seven following fractions (total 3.5 litres) are combined, evaporated and the residue is recrystallized from 40 ml. of isopropanol, to yield trans-4-[5-nitrothiazolyl-(2)]-2,6-dimethylthiomorpholine metling at 119–121° C.

The elution is continued and the next 2.5 litres (mixed fraction) are discarded. The following 4 litres are combined, evaporated and the residue recrystallized from 30 ml. of methanol, to yield cis-4-[5-nitrothiazolyl-(2)]-2,6-dimethylthiomorpholine melting at 104–106° C.

EXAMPLE 8

A solution of 20.0 g. of m-chloroperbenzoic acid of 85% strength in ½ litre of methylenechloride is stirred dropwise within 1 hour at 20–25° C. into a solution of 25.9 g. of cis-4-[5-nitrothiazolyl-(2)]-2,6-dimethylthiomorpholine in ½ litre of methylenechloride. The batch is stirred on for 3 hours at room temperature and the clear reaction mixture is agitated with 2× 300 ml. of 0.5 N-aqueous sodium bicarbonate solution and then with 2× 200 ml. of water. The methylenechloride solution is dried over anhydrous sodium sulphate and evaporated. The solid residue is recrystallized from 150 ml. of methanol. After another recrystallization from 150 ml. of methanol cis-4-[5-nitrothiazoly-(2)]-2,6-dimethylthiomorpholine-1-oxide of the formula

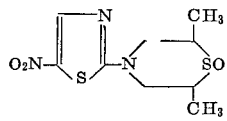

is obtained which melts at 144–146° C.

Cis - 4 - [5 - nitrothiazolyl - (2)]-2,6-dimethylthiomorpholine can be prepared by the process described in Example 7 from 16.5 g. of 2-chloro-5-nitrothiazole and 13.1 g. of cis-2,6-dimethylthiomorpholine. It melts at 104–106° C.

Cis-2,6-dimethylthiomorpholine is accessible by careful fractional distillation of the isomer mixture obtained by condensing diallylamine with hydrogen sulphide; it forms a water-clear oil boiling at 110° C. under 63 mm. Hg pressure.

EXAMPLE 9

A solution of 27.5 g. of m-chloroperbenzoic acid of 85% strength in 600 ml. of methylenechloride is stirred dropwise within 1 hour at 20–25° C. into a solution of 17.0 g. of cis-4-[5-nitrothiazolyl-(2)]-2,6-dimethylthiomorpholine in 800 ml. of methylenechloride. The batch is stirred on for 4 hours at room temperature, the precipitated m-chlorobenzoic acid is suctioned off and the filtrate is agitated with 2× 500 ml. of 0.5 N-aqueous sodium bicarbonate solution and then with 2× 200 ml. of water. The methylenechloride solution is dried over anhydrous magnesium sulphate and evaporated. The residue is triturated with 150 ml. of isopropanol, suctioned and recrystallized from 250 ml. of dioxane, to yield cis-4-[5-nitrothiazolyl - (2)] - 2,6 - dimethylthiomorpholine - 1,1-dioxide of the formula

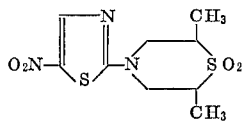

melting at 216–217° C.

EXAMPLE 10

A solution of 27.5 g. of m-chloroperbenzoic acid of 85% strength in 600 ml. of methylenechloride is stirred dropwise within 1 hour at 20–25° C. into a solution of 17.0 g. of trans-4-[5-nitrothiazolyl-(2)]-2,6-dimethylthiomorpholine in 800 ml. of methylenechloride. The batch is stirred on for 4 hours at room temperature, the precipitated m-chlorobenzoic acid suctioned off and the filtrate agitated with 2× 500 ml. of 0.5 N-aqueous sodium bicarbonate solution and then with 2× 200 ml. of water. The methylenchloride solution is dried over anhydrous magnesium sulphate and evaporated, and the residue thoroughly triturated with isopropanol and suctioned, to yield trans-4-[5-nitrothiazolyl-(2)]-2,6-dimethylthiomorpholine-1,1-dioxide of the formula

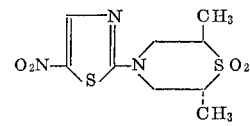

melting at 206–207° C.

EXAMPLE 11

A mixture of 10 ml. of concentrated sulphuric acid and 10 ml. of concentrated nitric acid is stirred dropwise within 30 minutes at 10 to 15° C. into a solution of 10.7 g. of cis-2-(2,6-dimethylthiomorpholino)-thiazole in 35 ml. of concentrated sulphuric acid. The batch is then stirred overnight at 30–35° C., whereupon the reaction mixture is poured over about ½ kg. of ice. After thawing, the whole is agitated three times with methylenechloride, dried over anhydrous magnesium sulphate and the methylenechloride extracts are evaporated. The residue is recrystallized from 50 ml. of methanol, to yield cis-4-[5-nitrothiazolyl-(2)]-2,6-dimethylthiomorpholine-1-oxide melting at 146–147° C.; it is identical with the product obtained by the process descrbed in Example 8.

Cis-2-(2,6-dimethylthiomorpholino)-thiazole can be prepared by condensing 2-bromothiazole with cis-2,6-dimethylthiomorpholine; it forms a water-clear oil boiling at 109–110° C. under 0.12 mm. Hg pressure.

EXAMPLE 12

A solution of 5.9 g. of divinylsulfone and 7.25 g. of 2-amino-5-nitrothiazole in 50 ml. of dimethylformamide is stirred for 6 hours in an oil bath at 150° C. The reaction mixture is then evaporated to dryness. The residue is triturated with 100 ml. of water. The water-insoluble solid product is filtered off with suction, washed with water, dried, and then agitated with 30 ml. of dimethylformamide for 2 hours, washed with dimethylformamide, and then recrystallized from 15 ml. of dimethylformamide. There is obtained in this manner 4-[5-nitrothiazolyl-(2)]-thiomorpholine-1,1-dioxide melts at 257° C. with decomposition and is identical with the product obtained according to Example 4.

EXAMPLE 13

A solution of 12.3 g. of 2-chloro-5-nitrothiazole in 35 ml. of dimethylsulfoxide is added dropwise in the course of 30 minutes while stirring at 20–25° C. to a solution of 27.0 g. of 3-(methoxymethyl)-thiomorpholine-1,1-dioxide in 150 ml. of dimethylsulfoxide. Stirring is continued overnight at room temperature. The reaction mixture is then concentrated under a high vacuum at a bath temperature of about 50° C. The residue is extracted by agitation with 350 ml. of chloroform and 200 ml. of water. The chloroformic layer is extracted with 4× 50 ml. of water. On working up, the chloroformic extract yields 4-[5-nitrothiazolyl - (2)] - 3 - (methoxymethyl) - thiomorpholine-1,1-dioxide of the formula

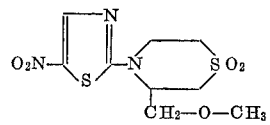

which melts at 155–157° C. (from ethyl acetate).

The 3 - (methoxymethyl) - thiomorpholine-1,1-dioxide used as starting material can be obtained for example by condensing 3-(methoxymethyl)-thioxan-1,1-dioxide with ammonia.

EXAMPLE 14

Tablets containing 500 mg. of 4-[5-nitrothiazolyl-(2)]-thiomorpholine-1,1-dioxide may be prepared with the following ingredients:

| | Per tablet, mg. |
|---|---|
| 4-[5-nitrothiazolyl - (2)] - thiomorpholine-1,1-dioxide | 500.0 |
| Wheat starch | 70.0 |
| Colloidal silicic acid with hydrolyzed starch | 30.0 |
| Magnesium stearate | 6.0 |
| Talc | 19.0 |
| | 625.0 |

Method

Half of the wheat starch is pasted with four times the quantity of water on a water-bath. 4-[5-nitrothiazolyl-(2)]-thiomorpholine-1,1-dioxide is kneaded with the paste to form a plastic mass. The colloidal silicic acid with hydrolyzed starch is then worked in in portions. The plastic mass is passed through a sieve having a 4-5 mm. mesh and dried at 45° C. The dried granulate is passed through a sieve of 0.8-1.4 mm. mesh and the remaining disintergrating and lubrication agents are then added. After further homogenization tablets having a diameter of 11.5 mm. and weighing 625 mg. are compressed in the conventional manner.

What is claimed is:

1. A compound of the formula

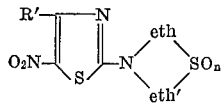

in which R' stands for a member selected from the group consisting of hydrogen and lower alkyl, $n$ for an integer from 1 to 2 and eth and eth' each stands for a member selected from the group consisting of 1,2-ethylene, lower alkylated 1,2-ethylene and lower alkoxylower alkylated 1,2-ethylene.

2. A compound as claimed in claim 1 in which R' is hydrogen.

3. A compound as claimed in claim 1, which compound is of the formula

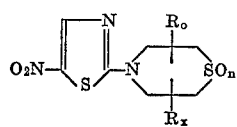

in which $n$ represents an integer from 1 to 2 and $R_o$ and $R_x$ each stands for a member selected from the group consisting of lower alkoxy-lower alkyl, lower alkyl and hydrogen.

4. A compound as claimed in claim 1 which compound is of the formula

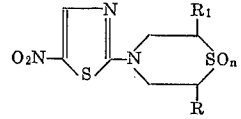

in which $n$ represents an integer from 1 to 2 and R and $R_1$ each stands for a member selected from the group consisting of lower alkyl and hydrogen.

5. A compound as claimed in claim 1, which compound is the 4-[5-nitro-thiazolyl-(2)]-2,6-dimethyl-thiomorpholine-1-oxide.

6. A compound as claimed in claim 1, which compound is the 4-[5-nitro-thiazolyl-(2)]-2,6-dimethyl-thiomorpholine-1,1-dioxide.

7. A compound as claimed in claim 1, which compound is the trans-4-[5-nitro-thiazolyl-(2)]-2,6-dimethyl-thiomorpholine-1-oxide.

8. A compound as claimed in claim 1, which compound is the cis-4-[5-nitro-thiazolyl-(2)]-2,6-dimethyl-thiomorpholine-1-oxide.

9. A compound as claimed in claim 1, which compound is the trans-4-[5-nitro-thiazolyl-(2)]-2,6-dimethyl-thiomorpholine-1,1-dioxide.

10. A compound as claimed in claim 1, which compound is the cis-4-[5-nitro-thiazolyl-(2)]-2,6-dimethyl-thiomorpholine-1,1-dioxide.

11. A compound as claimed in claim 1, which compound is the 4-[5-nitrothiazolyl-(2)]-thiomorpholine-1-oxide.

12. A compound as claimed in claim 1, which compound is the 4-[5-nitrothiazolyl-(2)]-thiomorpholine-1,1-dioxide.

13. A compound as claimed in claim 1, which compound is the 4-[5-nitrothiazolyl-(2)]-3-(methoxymethyl)-thiomorpholine-1,1-dioxide.

References Cited

UNITED STATES PATENTS 3,318,904   5/1967   Schmidt et al. _____ 260—243

ALEX MAZEL, Primary Examiner

R. J. GALLAGHER, Assistant Examiner

U.S. Cl. X.R.

260—306.8; 424—246